(12) United States Patent
Lu et al.

(10) Patent No.: US 11,989,845 B2
(45) Date of Patent: *May 21, 2024

(54) IMPLEMENTATION AND DISPLAY OF AUGMENTED REALITY

(71) Applicant: Beijing Zitiao Network Technology Co., Ltd., Beijing (CN)

(72) Inventors: Zhixiong Lu, Beijing (CN); Zhili Chen, Los Angeles, CA (US); Jingcong Zhang, Los Angeles, CA (US); Zihao Chen, Los Angeles, CA (US)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/100,521

(22) Filed: Jan. 23, 2023

(65) Prior Publication Data

US 2023/0162452 A1 May 25, 2023

Related U.S. Application Data

(63) Continuation of application No. 17/695,636, filed on Mar. 15, 2022, now Pat. No. 11,594,000, which is a (Continued)

(30) Foreign Application Priority Data

Sep. 9, 2020 (CN) .......................... 202010937921.6

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/011* (2013.01); *G06T 7/11* (2017.01); *G06T 13/40* (2013.01); *G06T 15/10* (2013.01)

(58) Field of Classification Search
None
See application file for complete search history.

(56) References Cited

U.S. PATENT DOCUMENTS

| 10,665,036 B1 | 5/2020 | Ha |
| 11,594,000 B2* | 2/2023 | Lu .......................... G06T 13/20 |

(Continued)

FOREIGN PATENT DOCUMENTS

| CN | 106791784 A | 5/2017 |
| CN | 107067474 A | 8/2017 |

(Continued)

OTHER PUBLICATIONS

Weng, Chung-Yi, Brian Curless, and Ira Kemelmacher-Shlizerman. "Photo wake-up: 3d character animation from a single photo." Proceedings of the IEEE/CVF conference on computer vision and pattern recognition. 2019. (Year: 2019).*

(Continued)

*Primary Examiner* — Ryan M Gray
(74) *Attorney, Agent, or Firm* — BakerHostetler

(57) ABSTRACT

The present disclosure describes techniques of implementing augmented reality. The techniques comprise obtaining a target object image in a real-time scene image captured by an image acquisition unit in response to an instruction from a user; generates a virtual image corresponding to a target object based on the target object image and an animation material; and displays the virtual image corresponding to the target object in the real-time scene.

19 Claims, 5 Drawing Sheets

Related U.S. Application Data continuation of application No. PCT/SG2021/050488, filed on Aug. 20, 2021.

(51) Int. Cl.
  *G06T 7/11* (2017.01)
  *G06T 13/40* (2011.01)
  *G06T 15/10* (2011.01)

(56) References Cited

U.S. PATENT DOCUMENTS

| | | | |
|---|---|---|---|
| 2007/0182739 | A1 | 8/2007 | Platonov et al. |
| 2013/0235078 | A1* | 9/2013 | Takahashi .................. G06T 7/74 345/633 |
| 2015/0254903 | A1 | 9/2015 | Sumner et al. |
| 2020/0074705 | A1* | 3/2020 | Berger .................... G06T 11/60 |
| 2020/0088463 | A1 | 3/2020 | Jeong et al. |
| 2020/0372723 | A1 | 11/2020 | Komissarov et al. |
| 2023/0236667 | A1* | 7/2023 | Lock ........................ G06T 13/80 345/156 |

FOREIGN PATENT DOCUMENTS

| | | |
|---|---|---|
| CN | 110335334 A | 10/2019 |
| CN | 110597397 A | 12/2019 |
| CN | 110941337 A | 3/2020 |
| CN | 111626183 A | 9/2020 |
| JP | 2014-203377 A | 10/2014 |
| JP | 2015-005034 A | 1/2015 |
| JP | 2019-053423 A | 4/2019 |
| JP | 2020-087429 A | 6/2020 |
| KR | 2012-0118655 A | 10/2012 |
| KR | 2015-0125862 A | 11/2015 |
| KR | 2017-0018930 A | 2/2017 |
| WO | WO 2015/192117 A1 | 12/2015 |
| WO | WO 2016/203792 A1 | 12/2016 |

OTHER PUBLICATIONS

Barakonyi, István, Thomas Psik, and Dieter Schmalstieg. "Agents that talk and hit back: Animated agents in augmented reality." Third IEEE and ACM International Symposium on Mixed and Augmented Reality. IEEE, 2004.*

Weng, Chung-Yi, Brian Curless, and Ira Kemelmacher-Shlizerman. "Photo wake-up: 3d character animation from a single photo." Proceedings of the IEEE/CVF Conference on Computer Vision and Pattern Recognition. 2019; p. 5908-5917.

International Patent Application No. PCT/SG2021/050488; Int'l Search Report; dated Oct. 19, 2021; 3 pages.

European Patent Application No. 21867238.4; Partial Supplementary Search Report; dated May 2, 2023; 13 pages.

European Patent Application No. 21867238.4; Extended Search Report; dated July, 3 2023; 15 pages.

Mohr et al.; "Retargeting Video Tutorials Showing Tools with Surface Contact to Augmented Reality"; ACM on Conf. on Information and Knowledge Management; May 2017; p. 6457-6558.

Ablavatski et al.; "Real-Time AR Self-Expression with Machine Learning"; https://ai.google.com/2019/03/real-time-ar-self-expression-with.html; Google; Mar. 2018; accessed Mar. 28, 2023; 8 pages.

Bell et al.; "View Management for Virtual and Augmented Reality"; ACM Symposium on User Interface Software and Technology; Nov. 2001; p. 101-110.

Sugano et al.; "The Effects of Shadow Representation of Virtual Objects in Augmented Reality"; $2^{nd}$ IEEE and ACM Int'l Symposium on Mixed and Augmented Reality; Oct. 2003; 8 pages.

* cited by examiner

IMPLEMENTATION AND DISPLAY OF AUGMENTED REALITY

The present application is a continuation of U.S. application Ser. No. 17/695,636, filed on Mar. 15, 2022, which is a continuation of International Patent Application No. PCT/SG2021/050488, filed on Aug. 20, 2021, which claims priority of Chinese Patent Application No. 202010937921.6, filed on Sep. 9, 2020, all of which are incorporated herein by reference in their entireties.

BACKGROUND

Augmented reality (AR) technology is a technology that integrates virtual information with the real world, widely uses various technical means, such as multimedia, three-dimensional modeling, real-time tracking and registration, intelligent interaction, and sensing, to simulate computer-generated virtual information, such as text, image, three-dimensional model, music, and video, and to apply the computer-generated virtual information to the real world. Two types of information complement each other, whereby "augmentation" of the real world is implemented. With the development of the AR technology, it has been extensively used in different industries.

An application of the AR technology in the prior art is to superimpose a virtual model (e.g., a cartoon character model, an animal model, etc.) onto the real world. However, the virtual model in the prior art is usually fixed, and is a virtual model image predesigned by developers, which results in a relatively single virtual model image, which cannot meet the diversified needs of users, thereby affecting the willingness of the users to use the AR technology and the use experience.

SUMMARY

Embodiments of the present disclosure provide an augmented reality-based display method and device, and a storage medium to solve the problem that the virtual model image is relatively single and cannot meet the diversified needs of users.

In a first aspect, an embodiment of the present disclosure provides an augmented reality-based display method, comprising: obtaining a target object image in a real-time scene image captured by an image acquisition unit in response to a first instruction from a user; generating a virtual image corresponding to a target object based on the target object image; and displaying the virtual image of the target object in the real-time scene image based on an augmented reality display technology.

In a second aspect, an embodiment of the present disclosure provides an augmented reality-based display device, comprising: a target object determination unit, configured to obtain a target object image in a real-time scene image captured by an image acquisition unit in response to a first instruction from a user; a generation unit, configured to generate a virtual image corresponding to a target object based on the target object image; and a display unit, configured to display the virtual image of the target object in the real-time scene image based on an augmented reality display technology.

In a third aspect, an embodiment of the present disclosure provides an electronic device, including: at least one processor and a memory; the memory stores computer executable instructions; the at least one processor executes the computer executable instructions stored in the memory to cause the at least one processor to perform the method described in the first aspect and various possible designs of the first aspect above.

In a fourth aspect, an embodiment of the present disclosure provides a computer readable storage medium, the computer readable storage medium stores computer executable instructions, when the computer executable instructions are executed by a processor, the method described in the first aspect and various possible designs of the first aspect above is implemented.

Embodiments of the present disclosure provide an augmented reality-based display method and device, and a storage medium. The method obtains a target object image in a real-time scene image captured by an image acquisition unit in response to a first instruction from a user; generates a virtual image corresponding to a target object based on the target object image; and displays the virtual image of the target object in the real-time scene image based on an augmented reality display technology. By obtaining the target object image and generating the virtual image corresponding to the target object based on the target object image, the problems that the virtual image needs to be pre-designed and the image is single and fixed can be avoided. In the embodiments of the present disclosure, various virtual images can be generated according to user demands, and the diverse needs of the users can be met. The virtual image can be displayed at a target position in the real-time scene image by using the augmented reality technology, so that the willingness of the user to use the AR technology and the use experience can be enhanced.

BRIEF DESCRIPTION OF THE DRAWINGS

In order to more clearly illustrate the technical solutions in the embodiments of the present disclosure or the technical solutions in the known technology, the following briefly introduces the accompanying drawings that need to be used in the descriptions of the embodiments or the known technology, it is apparent that the accompanying drawings in the following description are some embodiments of the present disclosure, for those skilled in the art, other drawings can also be obtained according to these drawings on the premise of no creative work.

DETAILED DESCRIPTION

In order to make objects, technical solutions, and advantages of the embodiments of the present disclosure more apparent, the technical solutions of the embodiments of the present disclosure will be clearly and completely described below with reference to the accompanying drawings in the embodiments of the present disclosure. Apparently, the described embodiments are just a part but not all of the embodiments of the present disclosure. Based on the embodiments in the present disclosure, those skilled in the art can obtain other embodiment(s), without any inventive work, which should be within the protection scope of the present disclosure.

The embodiments of the present disclosure can be applied to any electronic device having an AR function, such as a smart phone, a tablet computer, and a wearable device, etc., the application scenarios of the embodiments of the present disclosure may include that, for example, an electronic device captures a real-time scene image through an image acquisition unit thereof, generates a corresponding virtual image according to a target object in the real-time scene, and finally performs augmented display of the virtual image corresponding to the target object in the real-time scene through an augmented reality-based display method according to various embodiments of the present disclosure, the augmented display includes: displaying a virtual object based on the augmented reality display technology. For example, the target object in the real-time scene image is a mango, and a virtual image corresponding to the target object mango is generated by using the method of generating a virtual image in the embodiments of the present disclosure. The virtual image corresponding to the target object mango can be enhanced and displayed in the real-time scene image and further dynamically displayed in the form of animation after the virtual image is processed by the augmented reality-based display method according to various embodiments of the present disclosure. Furthermore, the virtual image corresponding to the mango may have limbs and/or expressions, and the limbs and/or expressions may have certain movements, such that the virtual image corresponding to the mango moves in the real-time scene.

Figure 1:
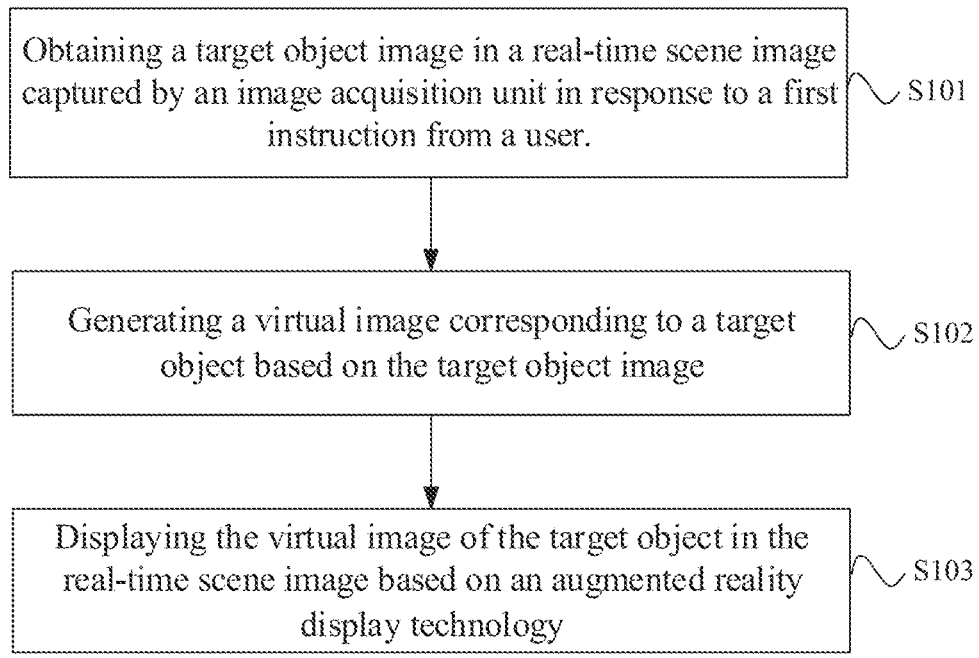
FIG. 1 is a schematic flowchart of an augmented reality-based display method according to an embodiment of the present disclosure.

Referring to FIG. 1, FIG. 1 is a schematic flowchart of an augmented reality-based display method according to an embodiment of the present disclosure. The method of the embodiment may be applied to an electronic device having the AR function. The augmented reality-based display method may include steps described below.

S101, obtaining a target object image in a real-time scene image captured by an image acquisition unit in response to a first instruction from a user.

In the embodiment, an image acquisition unit, such as a camera, of the electronic device may capture a real-time scene image and display the real-time scene image in a display unit of the electronic device. When a user wants to obtain a virtual image corresponding to a certain target object image in the real-time scene image, the user may give a first instruction such that the electronic device obtains the target object image in the real-time scene image in accordance with the first instruction. In one embodiment, the electronic device may, according to the first instruction, replicate the same target object image as the obtained target object image based on the target object image in the real-time scene image captured by the image acquisition unit, and generate a virtual image based on the replicated target object image.

Figure 2A:
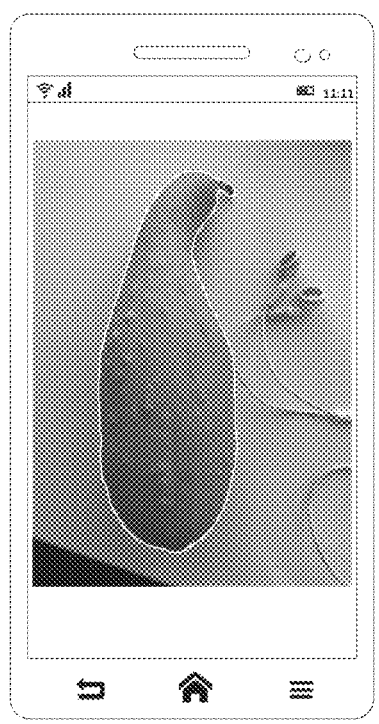
FIG. 2A is a diagram illustrating an example of displaying a contour of a target object image according to an embodiment of the present disclosure.

In particular, the electronic device may segment a target object from the real-time scene image to obtain a target object image. Further, the electronic device may tag the target object image obtained after the target object is segmented. Specifically, the electronic device may run an object segmentation algorithm that is pre-loaded to segment the target object from the real-time scene image to obtain the target object image. The object segmentation algorithm used in the embodiment of the present disclosure may include a salient object segmentation algorithm, during segmentation, a salient object in the real-time scene image can be used as the target object and be segmented to obtain the target object image. The salient object may be an object having a significant difference from a background color in the real-time scene image, and may also be an object in a central region of the real-time scene image, or an object occupying the largest area in the real-time scene image, etc. For example, as shown in FIG. 2A, a mango in a real-time scene image is located in the central region of the real-time scene image and occupies the largest area, and thus can be taken as the target object. Besides, a pair of earphones is not located in the central region of the real-time scene image and occupies a much smaller area than the mango, and thus is not taken as the target object.

Figure 2B:
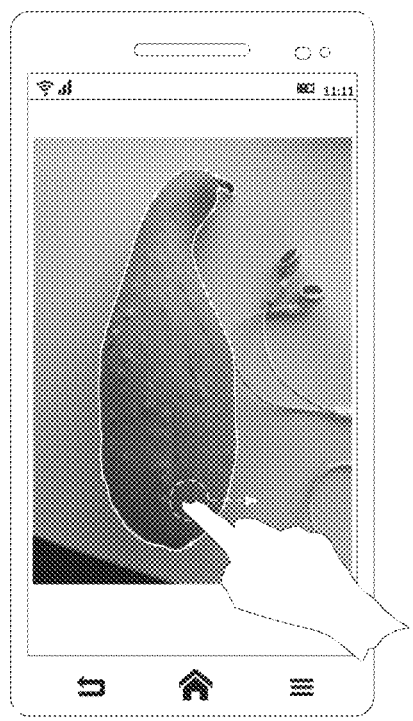
FIG. 2B is a diagram illustrating an example of a user issuing a first instruction and determining a target object image according to an embodiment of the present disclosure.

Further, when the electronic device obtains the target object image and tags the target object image, the electronic device may highlight the target object image. For example, as shown in FIG. 2A, the contour of the target object image may be highlighted, alternatively, the target object image can also be highlighted, alternatively, image region other than the target object image may be displayed at a lower brightness, etc., thereby allowing a user to confirm whether the target object currently segmented by the electronic device is consistent with the target object required by the user. When the user confirms that the target object is consistent with the target object required by the user, the user may issue the first instruction, where the first instruction includes but is not limited to a click operation instruction, a drag operation instruction, a voice operation instruction, an operation instruction obtained by expression recognition, and the like for the tagged target object image. The present disclosure has no particular limitation on the specific form of the first instruction. As shown in FIG. 2B, the user may give the above-mentioned drag operation instruction by dragging within the contour region of the target object image. When the user confirms that the target object is inconsistent with the target object required by the user, the user may move the electronic device, so that the image acquisition unit of the electronic device changes the angle to re-capture a real-time scene image, and then run the object segmentation algorithm again to segment a salient object in the real-time scene image as the target object and tag the obtained target object image. Thus, the user can reconfirm whether the current target object determined by the electronic device is consistent with the target object required by the user and whether the segmentation effect meets the user's expectation.

Optionally, when the electronic device obtains the target object image and tags the target object image, a prompt message may also be displayed in the display unit, for example, prompt words, such as "focus on the object to scan, and drag", may be displayed, or dynamic prompt figures, such as a dynamic prompt figure of dragging the target object image and placing the target object image onto a plane with a finger, may be displayed, thereby prompting the user how to confirm and operate the target object image.

S102, generating a virtual image corresponding to a target object based on the target object image.

Figure 3:
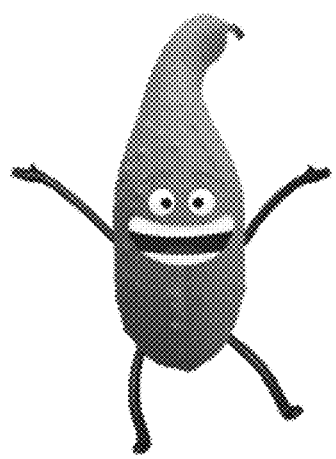
FIG. 3 is a diagram illustrating an example of a virtual image corresponding to a target object image according to an embodiment of the present disclosure.

In the embodiment, after obtaining the target object image (e.g., the target object image obtained after replicating from the original target object image), the electronic device may generate the virtual image corresponding to the target object based on the target object image, where the virtual image may have a limb-body movement and/or an expression movement. For example, when the object target image is the image of a mango, the corresponding virtual image may have limbs and facial expressions on the image of the mango, as shown in FIG. 3. Further, the limbs and expressions may have certain movements to drive the virtual image of the mango to move on the screen of the electronic device.

Alternatively, when generating the virtual image corresponding to the target object based on the target object image, the target object image may be synthesized with an animation material to generate the virtual image corresponding to the target object, where the animation material includes a limb-body animation material and/or an expression animation material of the virtual image. In other words, in the embodiment, the limb-body movement and/or the expression movement of the virtual image corresponding to the target object may be preset to generate corresponding limb-body animation material and/or an expression animation material for use in subsequent synthesis process. That is to say, the limb-body animation material and/or expression animation material may be added to the target object image to obtain the virtual image corresponding to the target object, and the limbs and/or expressions of the virtual image may perform certain movements according to the playback of the limb-body animation material and/or expression animation material.

S103, displaying the virtual image of the target object in the real-time scene image based on an augmented reality display technology.

Figure 4:
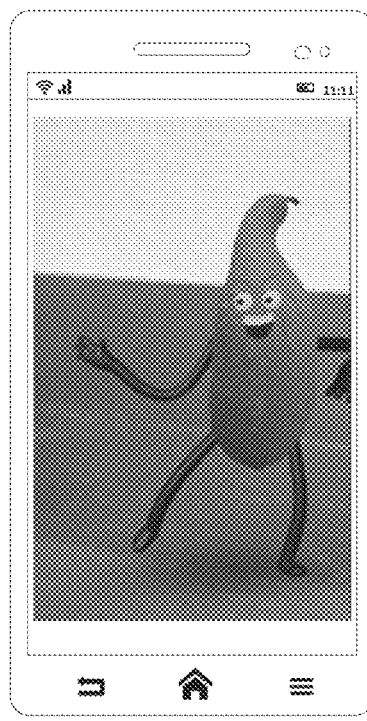
FIG. 4 is a diagram illustrating an example of displaying a virtual image in a real-time scene image according to an embodiment of the present disclosure.

In the embodiment, after obtaining the virtual image of the target object, the electronic device may display the virtual image of the target object in the real-time scene image by the augmented reality display technology. That is to say, the virtual image may be superimposed onto the realistic real-time scene image by the augmented reality display technology to achieve the effect of augmented display, as shown in FIG. 4. In particular, the virtual image may be displayed at any position in the real-time scene image, for example, in an arbitrary plane region detected in the real-time scene image or at a target position specified by the user in the real-time scene image, which will not be limited in the embodiment.

In an alternative embodiment, the user may drag the obtained replicated target object image from the initial position of the original target object image to a position in the real-time scene image. Further, the virtual image of the target object is displayed at this position based on the augmented reality display technology. Alternatively, the virtual image of the target object generated based on the replicated target object image may be displayed first, and then the virtual image may be displayed at a position in the real-time scene image based on the user's drag operation.

In one embodiment, the user may also rotate, zoom in or out, or move the displayed virtual image. For example, the user may give a control instruction for the virtual image on the display interface of the electronic device. The control instruction may include, but are not limited to, a rotation control instruction, a zoom-out control instruction, a move control instruction, and a zoom-in control instruction, and the electronic device may perform corresponding control on the virtual image in response to the user's control instruction for the virtual image. It needs to be noted that the rotation in the embodiment may include a change in the angle of the virtual image under any case, and the move may include a change in the position of the virtual image under any case. The zoom-in or zoom-out (scaling) may include a change in the size of the virtual image under any case. As a matter of course, in the embodiment, the use may also perform more other interaction processes with the virtual image, which, for the sake of brevity, will not be described one by one redundantly herein.

In the augmented reality-based display method provided in the embodiment, obtaining the target object image in the real-time scene image captured by the image acquisition unit in response to the first instruction from the user, generating the virtual image corresponding to the target object based on the target object image, and enhancing to display the virtual image in the real-time scene image based on the augmented reality display technology. By acquiring the target object image and generating the virtual image corresponding to the target object based on the target object image, the problems that the virtual image needs to be pre-designed and the image is single and fixed can be avoided. In the embodiment, various virtual images can be generated according to user demands, and the diversified needs of the users can be met. The virtual image can be displayed at the target position in the real-time scene image by using the augmented reality technology, so that the willingness of the user to use the AR technology and the use experience can be enhanced.

Figure 5:
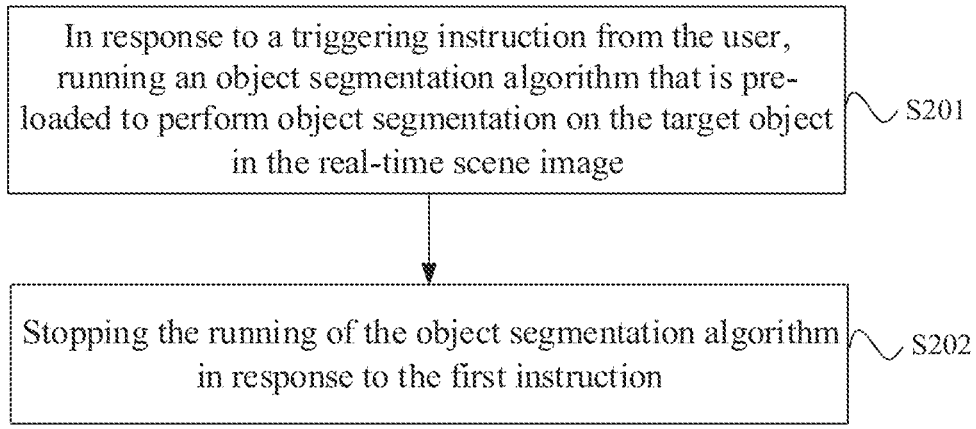
FIG. 5 is a schematic flowchart of an augmented reality-based display method according to an embodiment of the present disclosure.

In one embodiment of the present disclosure, optionally, when obtaining the target object image in the real-time scene image captured by the image acquisition unit, for the object segmentation algorithm, in order to prevent the object segmentation algorithm from running for a long time and occupying the computing resource of the electronic device, the object segmentation algorithm may be controlled to run timely and stop running. As shown in FIG. 5, the specific process may include the following steps:

S201, in response to a triggering instruction from the user, running an object segmentation algorithm that is pre-loaded to perform object segmentation on the target object in the real-time scene image; and S202, stopping the running of the object segmentation algorithm in response to the first instruction.

In the embodiment, when the object segmentation algorithm needs to be run, the user can give a triggering instruction. The triggering instruction may be a triggering instruction of turning on the image acquisition unit, or a triggering instruction issued by the user when the user triggers a start button in the interface in the process when the image acquisition unit captures the real-time scene image. The electronic device starts and runs the object segmentation algorithm in response to the triggering instruction from the user, thereby beginning to segment the target object from the real-time scene image. Further, after the user gives the first instruction and the electronic device has obtained the target object image in the real-time scene image according to the first instruction, the running of the object segmentation algorithm can be stopped at this point.

As a matter of course, the user may control the object segmentation algorithm to stop running in other ways, for example, by closing the image acquisition unit or triggering a stop button in the interface, which will not be limited herein.

For example, the electronic device runs the object segmentation algorithm in an algorithm module. When a first triggering instruction (corresponding to an instruction to trigger the algorithm to run) is received, the running of the object segmentation algorithm is started. When a second triggering instruction (corresponding to an instruction to trigger the algorithm to stop running) is received, the running of the object segmentation algorithm is stopped.

In one embodiment, the user can also control the start of the object segmentation algorithm through a long press operation. The object segmentation algorithm may keep running in the process of the long press operation. When the long press operation stops, the running of the object segmentation algorithm may be terminated.

The object segmentation algorithm is controlled to run in time and stop running as described above, and therefore, it can be avoided that the object segmentation algorithm runs for a long time in the electronic device and the computing resource of the electronic device can be saved.

On the basis of any embodiment described above, when generating the virtual image corresponding to the target object based on the target object image, the target object image may be synthesized with an animation material to generate the virtual image corresponding to the target object, the animation material includes a limb-body animation material and/or an expression animation material of the virtual image.

Figure 6:
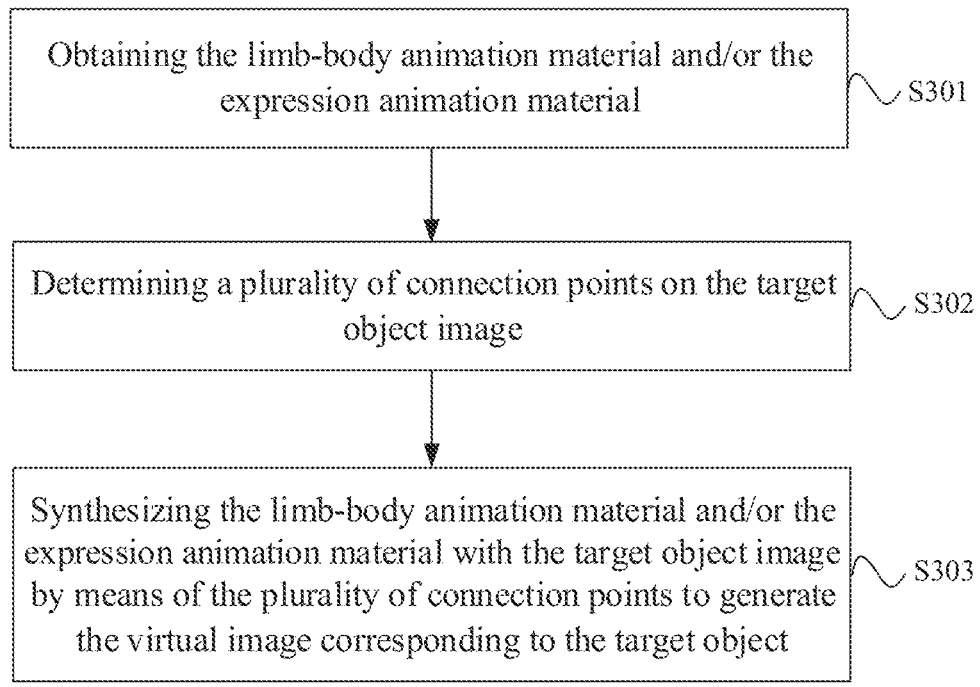
FIG. 6 is a schematic flowchart of an augmented reality-based display method according to an embodiment of the present disclosure.

In one embodiment, as shown in FIG. 6, the step of synthesizing the target object image with an animation material may specifically include:

S301, obtaining the limb-body animation material and/or the expression animation material;

S302, determining a plurality of connection points on the target object image; and S303, synthesizing the limb-body animation material and/or the expression animation material with the target object image by means of the plurality of connection points to generate the virtual image corresponding to the target object.

Figure 7:
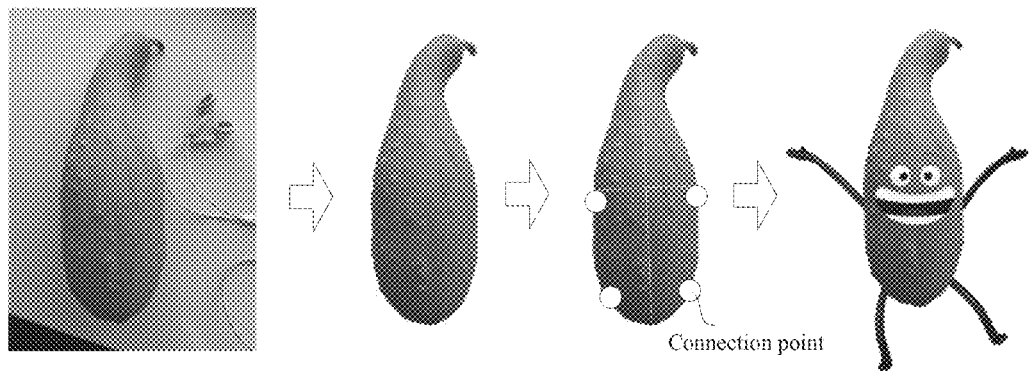
FIG. 7 is a diagram illustrating an example of a process of obtaining a virtual image corresponding to a target object according to an embodiment of the present disclosure.

In the embodiment, the electronic device may firstly obtain the limb-body animation material and/or the expression animation material of the virtual image, where the limb-body animation material and/or the expression animation material may be pre-configured and stored in the electronic device. When synthesis is required, the electronic device may extract the limb-body animation material and/or the expression animation material and then determine a plurality of connection points on the target object image based on the properties (e.g., shape, size, texture) of the target object image, where the connection points are positions where the limb-body animation material and/or the expression animation material is combined with the target object image. For example, the electronic device may set the target object image as the trunk of the body of the virtual image and the plurality of connection points determined on the target image as limb connection points. Thus, the connection points may include the connection positions of the limbs with the trunk of the body, and the electronic device may then synthesize the limb-body animation material with the target object image by means of the connection points such that the target object image has the limbs. In addition, the electronic device may also determine, according to the target object image, the placement position of an expression on the trunk of the body of the virtual image corresponding to the target object image on the target object image, and synthesize the expression animation material with the target object image such that the target object image has the expression. In addition, the limbs and/or the expression may also have certain animation effects, whereby the virtual image corresponding to the target object having the animation effects is further obtained, as shown in FIG. 7 in detail.

Further, the electronic device may also play the animation material, including playing the limb-body animation material and/or the expression animation material, thus performing movement and/or expression control on the virtual image, i.e., enabling the limbs and/or the expression of the virtual image corresponding to the target object to show corresponding movements.

Specifically, the electronic device may play the animation material according to preset animation frames of the animation material to perform movement and/or expression control on the virtual image, and/or generate and play animation frames of the animation material based on the limb-body movement and/or expression of the user to perform movement and/or expression control on the virtual image corresponding to the target object. In other words, the above-mentioned animation material may include the preset animation frames, and it may be preset in the preset animation frames what specific animations are shown for the limbs and/or expressions. In one embodiment, the electronic device may also capture images of the user in real time and generate the animation frames of the limb-body animation material and/or expression animation material according to the limb-body movement and/or expression movement of the user, thus achieving that the user can control the movements of the virtual image corresponding to the target object through movements of the user. For example, when the user makes a certain limb-body movement, the virtual image correspondingly shows the same limb-body movement, and/or when the user makes a certain expression, the virtual image correspondingly shows the same expression. The operation experience and joy of the user can be enhanced by driving and controlling the movements of the virtual image corresponding to the target object using the user's movements.

On the basis of any embodiment described above, the step of displaying the virtual image of the target object at a target position in the real-time scene image based on the augmented reality display technology includes the following operations:

creating a virtual plane in the real-time scene image; generating a three-dimensional (3D) space at the virtual plane; and displaying the virtual image of the target object in the 3D space that is generated based on the augmented reality display technology.

In the embodiment, when performing the augmented display of the virtual image of the target object, in order to ensure that the movements of the virtual image in the real-time scene image is more realistic and three-dimensional, a virtual 3D space may be created in the real-time scene image. Specifically, the virtual plane is first created in the real-time scene image, and then the 3D space is generated onto the virtual plane on the basis of the virtual plane, furthermore, the virtual image is enhanced and displayed in the 3D space based on the augmented reality display technology.

On the basis of the above embodiment, creating the virtual plane in the real-time scene image may specifically include:

in a case of detecting that a target plane region exists in the real-time scene image, creating the virtual plane based on the target plane region, the target plane region being a plane region having a distance to the image acquisition unit within a first preset distance range and/or a plane region located in a central region of the real-time scene image; or, creating the virtual plane at a particular position in the real-time scene image.

In the embodiment, the electronic device may detect a plane region included in the real-time scene image based on the real-time scene image through, for example, a simultaneous localization and mapping (SLAM) algorithm, and determine whether there is a plane region having a distance from the image acquisition unit within the first preset range and/or a plane region in the central region of the real-time scene image. If such a plane region exists, the plane region detected may be used as the target plane region. Further, the virtual plane is created on the basis of the target plane region, the virtual plane may be close to the target plane region, or be parallel to the target plane region and keep a certain fixed distance to the target plane region. If no target plane region is detected by the electronic device, the virtual plane may be created at a particular position in the real-time scene image. Alternatively, the electronic device does not detect the target plane region, the virtual plane is directly created at a particular position in the real-time scene image, where the particular position in the real-time scene image may include regions such as the central region or the upper right corner of the real-time scene image, and a position where the particular position is specifically located in the real-time scene image may be set as needed in practice.

On the basis of the above embodiment, when displaying the virtual image of the target object in the 3D space generated, because the 3D space may be relatively large, it needs to be determined that the virtual image is specially displayed at a target position of the 3D space. That is to say, the target position may be determined in the 3D space first, and then the virtual image of the target object may be displayed at the target position of the 3D space based on the augmented reality display technology.

On the basis of the above embodiment, determining the target position in the 3D space may specifically include:

receiving a position specifying instruction from the user, establishing a three-dimensional anchor point in the three-dimensional space based on a position point triggered by the position specifying instruction from the user, and using the three-dimensional anchor point as the target position.

In the embodiment, the user may issue the position specifying instruction, and the electronic device may determine the position point triggered by the position specifying instruction from the user after receiving the position specifying instruction from the user. A line extends from the position point to the 3D space to form an intersection point between the line and the 3D space, and the 3D anchor point is created in the 3D space based on the intersection point. The 3D anchor point is the target position for displaying the virtual image in the 3D space, and then the electronic device may perform the augmented display of the virtual image of the target object at the 3D anchor point in the 3D space.

Optionally, the position specifying instruction from the user may be an end instruction for the user's drag operation on the virtual image, and the position (i.e., where the user's drag is ended) triggered by the drag end instruction is the position point triggered by the position specifying instruction from the user. In addition, the position specifying instruction may not be limited to the end instruction for the user's drag operation on the virtual image, and may also be a click operation instruction from the user, and the position point (i.e., where the user clicks) triggered by the click operation instruction is the position point triggered by the position specifying instruction from the user.

Of course, the electronic device may also display a virtual model at any position in the real-time scene image, for example, display in an arbitrary plane region identified by the electronic device in the real-time scene image. The electronic device may determine the display position of the virtual model in other ways, which will not be limited herein.

On the basis of any embodiment described above, a pre-placement stage is further included after generating the virtual image corresponding to the target object based on the target object image and before performing the augmented display of the virtual image of the target object at the target position in the real-time scene image. That is to say, the virtual image corresponding to the target object may be suspended at a predetermined position in front of the image acquisition unit, and the virtual image may be then displayed at the target position after the target position in the real-time scene image is confirmed.

On the basis of any embodiment described above, steps S101-S103 may also be performed for a plurality of times in the embodiment such that a plurality of virtual images are placed in the real-time scene image.

Optionally, in a case that at least one virtual image already exists in the real-time scene image and a distance between a position of the at least one virtual image already existing and the virtual image corresponding to the target object exceeds a second preset distance range, the at least one virtual image already existing is moved into a second predetermined range of the virtual image corresponding to the target object and displayed. In other words, in the embodiment, if the existing virtual image in the real-time scene image is too away from the current placement position of the virtual image corresponding to the target object and is beyond the second preset distance range, the existing virtual image may also be moved into the vicinity range of the virtual image corresponding to the target object, i.e., within the second preset distance range, so that a plurality of virtual images can be displayed better and more clearly. In addition, a top limit of the number of virtual images that can be displayed at most in the real-time scene image may be set. If the number of the virtual images existing in the real-time scene image reaches the top limit, when a new virtual image is added, the virtual image displayed earliest may be replaced by the new virtual image.

Optionally, if a plurality of virtual images already exist in the real-time scene image, in order to avoid the phenomenon that the plurality of virtual images that already exist in the real-time scene image cross one another, i.e., to avoid models from passing through one another, a collision detection may be performed among the virtual images. When it is determined that a collision occurs between any two virtual images, the electronic device moves either of the two virtual images colliding with each other. In particular, the collision detection is mainly directed to detect whether any two virtual images in the space cross or interfere with each other. For example, when the limbs or trunks of a first virtual image and a second virtual image appear at the same spatial position in the 3D space, it indicates that the first virtual image and the second virtual image interfere with each other. Accordingly, the first virtual image may be moved away and/or the second virtual image may be moved away until the first virtual image and the second virtual image do not interfere with each other.

On the basis of any embodiment described above, when the virtual image of the target object in the real-time scene image is enhanced and displayed based on the augmented reality display technology, a shadow of the virtual image may also be displayed at a particular position around the virtual image.

In the embodiment, the shadow of the virtual image may be obtained and then placed at a particular position around the virtual image, the placement position of the shadow may be determined based on the position of a light source in the real-time scene. For example, when the light source is on the left of the virtual image, the shadow is placed on the right of the virtual image, and the position of the light source may be determined based on the real-time scene image. For example, the position of the light source may be determined by determining in which direction the shadow of the target object in the real-time scene image is oriented. Alternatively, the placement position of the shadow of the virtual image may be determined by detecting the position of the light source in the real-time scene image. Alternatively, the placement position of the shadow of the virtual image may also be determined directly. As a matter of course, the position where the shadow of the virtual image is placed may also be determined in other ways. For example, the shadow may also be placed in a random direction or at a fixed position. In addition, optionally, the shadow of the virtual image may be correspondingly adjusted according to the movements of the virtual image, so that the shadow of the virtual image is adjusted according to the movements of the virtual image to achieve more realistic effects.

In the foregoing embodiments, enhancing and displaying the virtual image of the target object at the target position in the real-time scene image may further include dynamically displaying the virtual image. For example, the animations of the virtual image may be dynamically displayed. Thus, the movement and expression animations of the virtual image may be presented on the interface to enhance the user's operation experience and joy.

Figure 8:
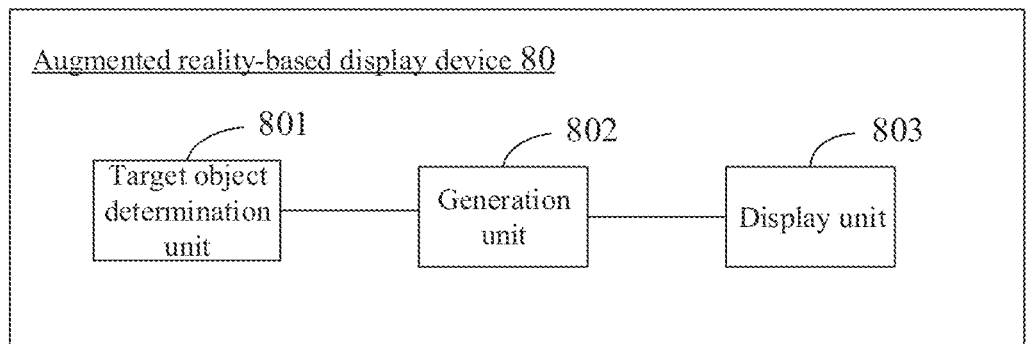
FIG. 8 is a structural block diagram of an augmented reality-based display device according to an embodiment of the present disclosure.

Corresponding to the augmented reality-based display method in the above embodiments, FIG. 8 is a structural block diagram of an augmented reality-based display device according to an embodiment of the present disclosure. For ease of description, only the parts related to the embodiments of the present disclosure are illustrated. With reference to FIG. 8, the augmented reality-based display device 80 includes a target object determination unit 801, a generation unit 802, and a display unit 803.

The target object determination unit 801 is configured to obtain a target object image in a real-time scene image captured by an image acquisition unit in response to a first instruction from a user.

The generation unit 802 is configured to generate a virtual image corresponding to a target object based on the target object image.

The display unit 803 is configured to display the virtual image of the target object in the real-time scene image based on the augmented reality display technology.

According to one or more embodiments of the present disclosure, the target object determination unit 801, when obtaining the target object image in the real-time scene image captured by the image acquisition unit, is configured to perform object segmentation on the target object in the real-time scene image to obtain the target object image and tag the target object image.

According to one or more embodiments of the present disclosure, the target object determination unit 801 is further configured to: in response to a triggering instruction from the user, run an object segmentation algorithm that is pre-loaded to perform object segmentation on the target object in the real-time scene image; and stop the running of the object segmentation algorithm in response to the first instruction.

According to one or more embodiments of the present disclosure, the generation unit 802, when generating the virtual image corresponding to the target object based on the target object image, is configured to: synthesize the target object image with an animation material to generate the virtual image corresponding to the target object.

Where the animation material includes a limb-body animation material and/or an expression animation material of the virtual image.

According to one or more embodiments of the present disclosure, the generation unit 802, when synthesizing the target object image with the animation material, is configured to: obtain the limb-body animation material and/or the expression animation material; determine a plurality of connection points on the target object image; and synthesize the limb-body animation material and/or the expression animation material with the target object image by means of the plurality of connection points to generate the virtual image corresponding to the target object.

According to one or more embodiments of the present disclosure, the display unit 803 is further configured to: play the animation material to perform movement and/or expression control on the virtual image.

According to one or more embodiments of the present disclosure, the display unit 803, when playing the animation material to perform movement and/or expression control on the virtual image, is configured to: play the animation material according to preset animation frames of the animation material to perform movement and/or expression control on the virtual image; and/or generate and play animation frames of the animation material based on a limb-body movement and/or an expression of the user to perform movement and/or expression control on the virtual image.

According to one or more embodiments of the present disclosure, the display unit 803 is further configured to: correspondingly control the virtual image in response to a control instruction for the virtual image from the user, the control instruction comprises at least one selected from a group consisting of: a rotation control instruction, a zoom-out control instruction, a move control instruction, and a zoom-in control instruction.

According to one or more embodiments of the present disclosure, the display unit 803, when displaying the virtual image of the target object in the real-time scene image based on the augmented reality display technology, is configured to: create a virtual plane in the real-time scene image; generate a 3D space at the virtual plane; and display the virtual image of the target object in the generated 3D space based on the augmented reality display technology.

According to one or more embodiments of the present disclosure, the display unit 803, when creating the virtual plane in the real-time scene image, is configured to: in a case of detecting that a target plane region exists in the real-time scene image, create the virtual plane based on the target plane region, where the target plane region is a plane region having a distance to the image acquisition unit within a first preset distance range and/or a plane region located in a central region of the real-time scene image; or create the virtual plane at a particular position in the real-time scene image.

According to one or more embodiments of the present disclosure, the display unit 803, when displaying the virtual image of the target object in the generated 3D space based on the augmented reality display technology, is configured to: determine a target position in the 3D space; and display the virtual image of the target object at the target position in the 3D space based on the augmented reality display technology.

According to one or more embodiments of the present disclosure, the display unit 803, when determining the target position in the 3D space, is configured to: receive a position specifying instruction from the user, create a 3D anchor point in the 3D space based on a position point triggered by the position specifying instruction from the user, and use the 3D anchor point as the target position.

According to one or more embodiments of the present disclosure, the display unit 803, after generating the virtual image corresponding to the target object based on the target object image and before displaying the virtual image of the target object in the real-time scene image based on the augmented reality display technology, is further configured to: suspend the virtual image at a predetermined position in front of the image acquisition unit.

According to one or more embodiments of the present disclosure, the display unit 803 is further configured to: in a case that at least one virtual image already exists in the real-time scene image and a distance between a position of the at least one virtual image already existing and the virtual image corresponding to the target object exceeds a second preset distance range, move the at least one virtual image already existing into a second predetermined range of the virtual image corresponding to the target object and displaying the at least one virtual image.

According to one or more embodiments of the present disclosure, the display unit 803 is further configured to: in a case that a plurality of virtual images already exist in the real-time scene image, perform collision detection among the plurality of virtual images; and when it is determined that a collision occurs between any two virtual images, move any one of the two virtual images colliding with each other.

According to one or more embodiments of the present disclosure, the display unit 803, when performing the augmented display of the virtual image of the target object at the target position in the real-time scene image, is further configured to: display a shadow of the virtual image at a particular position around the virtual image.

According to one or more embodiments of the present disclosure, the display unit 803 is further configured to: dynamically display the virtual image of the target object in the real-time scene image based on the augmented reality display technology.

The augmented reality-based display device provided in the embodiment may be used to perform the technical solutions of the augmented reality-based display method of the method embodiments described above, the implementation principle and the technical effect of the augmented reality-based display device are similar to those of the method embodiments, and details are not described herein again in the embodiment.

Figure 9:
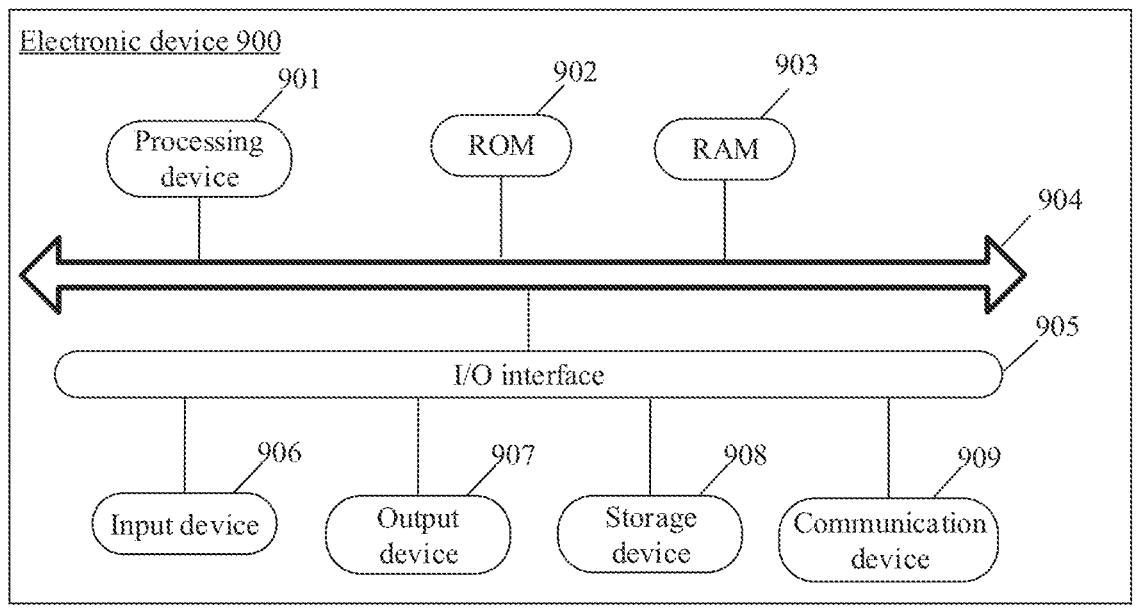
FIG. 9 is a schematic diagram illustrating a hardware structure of an electronic device according to an embodiment of the present disclosure.

Referring to FIG. 9 that is a schematic diagram illustrating a structure suitable for implementing an electronic device 900 according to an embodiment of the present disclosure. The electronic device 900 may be a terminal device or a server, and may be used to perform the augmented reality-based display method in the method embodiments described above. In particular, the terminal device may include, but is not limited to, mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device, and the like, and fixed terminals such as a digital TV, a desktop computer, and the like. The electronic device shown in FIG. 9 is merely an example, and should not impose any limitation on the functions and the range of use of the embodiments of the present disclosure.

As shown in FIG. 9, the electronic device 900 may include a processing device (e.g., a central processing unit, a graphics processing unit, etc.) 901, which can perform various suitable actions and processing according to a program stored in a read-only memory (ROM) 902 or a program loaded from a storage device 908 into a random access memory (RAM) 903. The RAM 903 further stores various programs and data required for operations of the electronic device 900. The processing device 901, the ROM 902, and the RAM 903 are connected to each other through a bus 904. An input/output (I/O) interface 905 is also connected to the bus 904.

Usually, the following devices may be connected to the I/O interface 905: an input device 906 including, for example, a touch screen, a touch pad, a keyboard, a mouse, a camera, a microphone, an accelerometer, a gyroscope, etc.; an output device 907 including, for example, a liquid crystal display (LCD), a loudspeaker, a vibrator, etc.; a storage device 908 including, for example, a magnetic tape, a hard disk, etc.; and a communication device 909. The communication unit 909 may allow the electronic device 900 to communicate wirelessly or by wire with other devices to exchange data. Although FIG. 9 illustrates the electronic device 900 having various devices, it is to be understood that all the illustrated devices are not necessarily implemented or included. More or less devices may be implemented or included alternatively.

Particularly, according to the embodiments of the present disclosure, the process described above with reference to the flowchart may be implemented as a computer software program. For example, an embodiment of the present disclosure includes a computer program product, which includes a computer program carried on a computer readable medium. The computer program includes program codes for executing the method shown in the flowchart, and may be used to execute the augmented reality-based display method in the method embodiments described above. In such an embodiment, the computer program may be downloaded online through the communication device 909 and installed, or installed from the storage device 908, or installed from the ROM 902. When the computer program is executed by the processing device 901, the above-mentioned functions defined in the method provided in the embodiments of the present disclosure are executed.

It needs to be noted that the computer readable medium described above in the present disclosure may be a computer readable signal medium or a computer readable storage medium or any combination thereof. For example, the computer readable storage medium may be, but not limited to, an electric, magnetic, optical, electromagnetic, infrared, or semiconductor system, apparatus, or device, or any combination of them. More specific examples of the computer readable storage medium may include, but are not limited to: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of them. In the present disclosure, the computer readable storage medium may be any tangible medium containing or storing a program that can be used by or in combination with an instruction execution system, apparatus, or device. In the present disclosure, the computer readable signal medium may include a data signal that propagates in a baseband or as a part of a carrier and carries computer readable program codes. The data signal propagating in such a manner may take a variety of forms, including but not limited to an electromagnetic signal, an optical signal, or any appropriate combination thereof. The computer readable signal medium may also be any computer readable medium other than the computer readable storage medium. The computer readable signal medium may send, propagate, or transmit a program used by or in combination with an instruction execution system, apparatus, or device. The program code contained on the computer readable medium may be transmitted by using any suitable medium, including but not limited to an electric wire, a fiber-optic cable, radio frequency (RF), and the like, or any appropriate combination of them.

The above-mentioned computer readable medium may be included in the electronic device described above, or may exist alone without being assembled into the electronic device.

The above-mentioned computer readable medium may carry one or more programs, when the one or more programs are executed by the electronic device, the electronic device is caused to perform the method illustrated in the above embodiments.

Computer program codes for performing the operations in the present disclosure may be written in one or more programming languages or a combination thereof. The programming languages include object oriented programming languages, such as Java, Smalltalk, and C++, and also include conventional procedural programming languages, such as "C" language or similar programming languages. The program code can be executed fully on a user's computer, executed partially on a user's computer, executed as an independent software package, executed partially on a user's computer and partially on a remote computer, or executed fully on a remote computer or a server. In the scenario involving a remote computer, the remote computer may be connected to the user's computer through any type of networks including a local area network (LAN) or a wide area network (WAN), or may be connected to an external computer (e.g., connected through the Internet from an Internet Service Provider).

The flowcharts and block diagrams in the accompanying drawings illustrate system architectures, functions, and operations that may be implemented by the system, method, and computer program products according to the various embodiments of the present disclosure. In this regard, each block in the flowcharts or block diagrams may represent a module, a program segment, or a part of code, and the module, the program segment, or the part of code includes one or more executable instructions for implementing specified logic functions. It should also be noted that, in some alternative implementations, functions marked in the blocks may also occur in an order different from the order designated in the accompanying drawings. For example, two consecutive blocks can actually be executed substantially in parallel, and they may sometimes be executed in a reverse order, which depends on involved functions. It should also be noted that each block in the flowcharts and/or block diagrams and combinations of the blocks in the flowcharts and/or block diagrams may be implemented by a dedicated hardware-based system for executing specified functions or operations, or may be implemented by a combination of a dedicated hardware and computer instructions.

Related units described in the embodiments of the present disclosure may be implemented by software, or may be implemented by hardware. The name of a unit does not constitute a limitation on the unit itself. For example, a first acquisition unit may also be described as "a unit for obtaining at least two Internet protocol addresses".

The functions described above in the present disclosure may be executed at least in part by one or more hardware logic components. For example, without limitations, exemplary types of the hardware logic components that can be used include: a field programmable gate array (FPGA), an application specific integrated circuit (ASIC), an application specific standard product (ASSP), a system on chip (SOC), a complex programmable logic device (CPLD), and the like.

In the context of the present disclosure, a machine readable medium may be a tangible medium that may contain or store a program for use by or in combination with an instruction execution system, apparatus, or device. The machine readable medium may be a machine readable signal medium or a machine readable storage medium. The machine readable medium may include but not be limited to an electronic, magnetic, optical, electromagnetic, infrared, or semiconductor system, apparatus, or device, or any appropriate combination of them. More specific examples of the machine readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of them.

In a first aspect, according to one or more embodiments of the present disclosure, an augmented reality-based display method is provided and includes: obtaining a target object image in a real-time scene image captured by an image acquisition unit in response to a first instruction from a user; generating a virtual image corresponding to a target object based on the target object image; and displaying the virtual image of the target object in the real-time scene image based on an augmented reality display technology.

According to one or more embodiments of the present disclosure, the obtaining a target object image in a real-time scene image captured by an image acquisition unit comprises: performing object segmentation on the target object in the real-time scene image to obtain the target object image, and tagging the target object image.

According to one or more embodiments of the present disclosure, the method further includes: in response to a triggering instruction from the user, running an object segmentation algorithm that is pre-loaded to perform object segmentation on the target object in the real-time scene image; and stopping the running of the object segmentation algorithm in response to the first instruction.

According to one or more embodiments of the present disclosure, the generating a virtual image corresponding to a target object based on the target object image comprises: synthesizing the target object image with an animation material to generate the virtual image corresponding to the target object. The animation material comprises a limb-body animation material and/or an expression animation material of the virtual image.

According to one or more embodiments of the present disclosure, the synthesizing the target object image with an animation material comprises: obtaining the limb-body animation material and/or the expression animation material; determining a plurality of connection points on the target object image; and synthesizing the limb-body animation material and/or the expression animation material with the target object image by means of the plurality of connection points to generate the virtual image corresponding to the target object.

According to one or more embodiments of the present disclosure, the method further includes: playing the animation material to perform movement and/or expression control on the virtual image.

According to one or more embodiments of the present disclosure, the playing the animation material to perform movement and/or expression control on the virtual image comprises: playing the animation material according to preset animation frames of the animation material to perform movement and/or expression control on the virtual image; and/or generating and playing animation frames of the animation material based on a limb-body movement and/or an expression of the user to perform movement and/or expression control on the virtual image.

According to one or more embodiments of the present disclosure, the method further includes: correspondingly controlling the virtual image in response to a control instruction for the virtual image from the user. The control instruction comprises at least one of: a rotation control instruction, a zoom-out control instruction, a move control instruction, and a zoom-in control instruction.

According to one or more embodiments of the present disclosure, the displaying the virtual image of the target object in the real-time scene image based on the augmented reality display technology comprises: creating a virtual plane in the real-time scene image; generating a three-dimensional space at the virtual plane; and displaying the virtual image of the target object in the three-dimensional space that is generated based on the augmented reality display technology.

According to one or more embodiments of the present disclosure, the creating a virtual plane in the real-time scene image comprises: in a case of detecting that a target plane region exists in the real-time scene image, creating the virtual plane based on the target plane region, where the target plane region is a plane region having a distance to the image acquisition unit within a first preset distance range and/or a plane region located in a central region of the real-time scene image; or creating the virtual plane at a particular position in the real-time scene image.

According to one or more embodiments of the present disclosure, the displaying the virtual image of the target object in the three-dimensional space that is generated based on the augmented reality display technology comprises: determining a target position in the three-dimensional space; and displaying the virtual image of the target object at the target position in the three-dimensional space based on the augmented reality display technology.

According to one or more embodiments of the present disclosure, the determining a target position in the three-dimensional space comprises: receiving a position specifying instruction from the user; establishing a three-dimensional anchor point in the three-dimensional space based on a position point triggered by the position specifying instruction from the user, and using the three-dimensional anchor point as the target position.

According to one or more embodiments of the present disclosure, after generating the virtual image corresponding to the target object based on the target object image and before displaying the virtual image of the target object in the real-time scene image based on the augmented reality display technology, the method further comprises: suspending the virtual image at a predetermined position in front of the image acquisition unit.

According to one or more embodiments of the present disclosure, the method further comprises: in a case that at least one virtual image already exists in the real-time scene image and a distance between a position of the at least one virtual image already existing and the virtual image corresponding to the target object exceeds a second preset distance range, moving the at least one virtual image already existing into a second predetermined range of the virtual image corresponding to the target object and displaying the at least one virtual image.

According to one or more embodiments of the present disclosure, the method further comprises: in a case that a plurality of virtual images already exist in the real-time scene image, performing collision detection among the plurality of virtual images; and when it is determined that a collision occurs between any two virtual images, moving any one of the two virtual images colliding with each other.

According to one or more embodiments of the present disclosure, in a case of displaying the virtual image of the target object in the real-time scene image based on the augmented reality display technology, the method further comprises: displaying a shadow of the virtual image at a particular position around the virtual image.

According to one or more embodiments of the present disclosure, the method further comprises: dynamically displaying the virtual image of the target object in the real-time scene image based on the augmented reality display technology.

In a second aspect, according to one or more embodiments of the present disclosure, an augmented reality-based display device is provided and includes: a target object determination unit, configured to obtain a target object image in a real-time scene image captured by an image acquisition unit in response to a first instruction from a user; a generation unit, configured to generate a virtual image corresponding to a target object based on the target object image; and a display unit, configured to display the virtual image of the target object in the real-time scene image based on an augmented reality display technology.

According to one or more embodiments of the present disclosure, when obtaining the target object image in the real-time scene image acquired by the image acquisition unit, the target object determination unit is configured to: perform object segmentation on the target object in the real-time scene image to obtain the target object image and tag the target object image.

According to one or more embodiments of the present disclosure, the target object determination unit is further configured to: in response to a triggering instruction from the user, run an object segmentation algorithm that is preloaded to perform object segmentation on the target object in the real-time scene image; and stop the running of the object segmentation algorithm in response to the first instruction.

According to one or more embodiments of the present disclosure, the generation unit, when generating the virtual image corresponding to the target object based on the target object image, is configured to: synthesize the target object image with an animation material to generate the virtual image corresponding to the target object. The animation material includes a limb-body animation material and/or an expression animation material of the virtual image.

According to one or more embodiments of the present disclosure, the generation unit, when synthesizing the target object image with the animation material, is configured to: obtain the limb-body animation material and/or the expression animation material; determine a plurality of connection points on the target object image; and synthesize the limb-body animation material and/or the expression animation material with the target object image by means of the plurality of connection points to generate the virtual image corresponding to the target object.

According to one or more embodiments of the present disclosure, the display unit is further configured to: play the animation material to perform movement and/or expression control on the virtual image.

According to one or more embodiments of the present disclosure, the display unit, when playing the animation material to perform movement and/or expression control on the virtual image, is configured to: play the animation material according to preset animation frames of the animation material to perform movement and/or expression control on the virtual image; and/or generate and play animation frames of the animation material based on a limb-body movement and/or an expression of the user to perform movement and/or expression control on the virtual image.

According to one or more embodiments of the present disclosure, the display unit is further configured to: correspondingly control the virtual image in response to a control instruction for the virtual image from the user, the control instruction comprises at least one selected from a group consisting of: a rotation control instruction, a zoom-out control instruction, a move control instruction, and a zoom-in control instruction.

According to one or more embodiments of the present disclosure, the display unit, when displaying the virtual image of the target object in the real-time scene image based on the augmented reality display technology, is configured to: create a virtual plane in the real-time scene image; generate a 3D space at the virtual plane; and display the virtual image of the target object in the generated 3D space based on the augmented reality display technology.

According to one or more embodiments of the present disclosure, the display unit, when creating the virtual plane in the real-time scene image, is configured to: in a case of detecting that a target plane region exists in the real-time scene image, create the virtual plane based on the target plane region, where the target plane region is a plane region having a distance to the image acquisition unit within a first preset distance range and/or a plane region located in a central region of the real-time scene image; or create the virtual plane at a particular position in the real-time scene image.

According to one or more embodiments of the present disclosure, the display unit, when displaying the virtual image of the target object in the generated 3D space based on the augmented reality display technology, is configured to: determine a target position in the 3D space; and display the virtual image of the target object at the target position in the 3D space based on the augmented reality display technology.

According to one or more embodiments of the present disclosure, the display unit, when determining the target position in the 3D space, is configured to: receive a position specifying instruction from the user, create a 3D anchor point in the 3D space based on a position point triggered by the position specifying instruction from the user, and use the 3D anchor point as the target position.

According to one or more embodiments of the present disclosure, the display unit, after generating the virtual image corresponding to the target object based on the target object image and before displaying the virtual image of the target object in the real-time scene image based on the augmented reality display technology, is further configured to: suspend the virtual image at a predetermined position in front of the image acquisition unit.

According to one or more embodiments of the present disclosure, the display unit is further configured to: in a case that at least one virtual image already exists in the real-time scene image and a distance between a position of the at least one virtual image already existing and the virtual image corresponding to the target object exceeds a second preset distance range, move the at least one virtual image already existing into a second predetermined range of the virtual image corresponding to the target object and displaying the at least one virtual image.

According to one or more embodiments of the present disclosure, the display unit is further configured to: in a case that a plurality of virtual images already exist in the real-time scene image, perform collision detection among the plurality of virtual images; and when it is determined that a collision occurs between any two virtual images, move any one of the two virtual images colliding with each other.

According to one or more embodiments of the present disclosure, the display unit, when performing the augmented display of the virtual image of the target object at the target position in the real-time scene image, is further configured to: display a shadow of the virtual image at a particular position around the virtual image.

According to one or more embodiments of the present disclosure, the display unit is further configured to: dynamically display the virtual image of the target object in the real-time scene image based on the augmented reality display technology.

In a third aspect, according to one or more embodiments of the present disclosure, an electronic device is provided and includes: at least one processor and a memory; the memory stores computer executable instructions; the at least one processor executes the computer executable instructions stored in the memory to cause the at least one processor to perform the method described in the first aspect and various possible designs of the first aspect above.

In a fourth aspect, according to one or more embodiments of the present disclosure, a computer readable storage medium is provided, the computer readable storage medium stores computer executable instructions, when the computer executable instructions are executed by a processor, the method described in the first aspect and various possible designs of the first aspect above is implemented.

The foregoing descriptions are merely the illustrations of the alternative embodiments of the present disclosure and the explanations of the technical principles involved. Those skilled in the art should understand that the scope of the disclosure involved in the present disclosure is not limited to the technical solutions formed by a specific combination of the technical features described above, and shall also cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated particular order or in a sequential order. Under certain circumstances, multitasking and parallel processing may be advantageous.

Similarly, while some specific implementation details are included in the above discussions, these shall not be construed as limitations to the scope of the present disclosure. Some features described in the context of a separate embodiment may also be combined in a single embodiment. Conversely, various features described in the context of a single embodiment may also be implemented in various embodiments individually or in a plurality of embodiments in any appropriate sub-combination.

Although the present subject matter has been described in a language specific to structural features and/or logical method acts, it will be appreciated that the subject matter defined in the appended claims is not necessarily limited to the particular features or acts described above. Rather, the particular features and acts described above are merely exemplary forms for implementing the claims.

What is claimed is:

1. A method, comprising:
    obtaining a target object image in a real-time scene image captured by an image acquisition unit in response to a first instruction from a user;
    generating a virtual image corresponding to a target object based on the target object image, wherein the generating a virtual image corresponding to a target object based on the target object further comprises:
        obtaining an animation material, the animation material comprising at least one of a limb-body animation material or an expression animation material, and
        synthesizing the animation material with the target object image and generating the virtual image corresponding to the target object;
    displaying the virtual image corresponding to the target object in the real-time scene image;
    wherein the method further comprises:
    in response to determining that a plurality of virtual images already exist in the real-time scene image, performing collision detection among the plurality of virtual images; and
    in response to determining that a collision occurs between any two virtual images, moving any one of the two virtual images colliding with each other.

2. The method according to claim 1, wherein the obtaining a target object image in a real-time scene image captured by an image acquisition unit comprises:
    performing object segmentation on the target object in the real-time scene image to obtain the target object image, and tagging the target object image.

3. The method according to claim 2, further comprising:
    in response to a triggering instruction from the user, running an object segmentation algorithm that is preloaded to perform object segmentation on the target object in the real-time scene image; and
    stopping the running of the object segmentation algorithm in response to the first instruction.

4. The method according to claim 1, wherein the synthesizing the animation material with the target object image further comprises:
    determining a plurality of connection points on the target object image, wherein the plurality of connection points indicate positions by which the animation material is connected to the target object image; and
    synthesizing the animation material with the target object image based on the plurality of connection points to generate the virtual image corresponding to the target object.

5. The method according to claim 1, further comprising:
    playing the animation material to perform at least one of movement or expression control on the virtual image.

6. The method according to claim 5, wherein the playing the animation material to perform at least one of movement or expression control on the virtual image further comprises:
    playing the animation material based on preset animation frames of the animation material to perform the at least one of movement or expression control on the virtual image; or
    generating and playing animation frames of the animation material based on a limb-body movement or an expression of the user to perform the at least one of movement or expression control on the virtual image.

7. The method according to claim 1, further comprising:
    causing to rotate, move, zoom out or zoom in on the virtual image in response to receiving an instruction of controlling the virtual image from the user, wherein the instruction comprises at least one of a rotation control instruction, a move control instruction, a zoom-out control instruction, or a zoom-in control instruction.

8. The method according to claim 1, wherein the displaying the virtual image corresponding to the target object in the real-time scene image based on an augmented reality display technology further comprises:
    creating a virtual plane in the real-time scene image;
    generating a three-dimensional space at the virtual plane; and
    displaying the virtual image corresponding to the target object in the three-dimensional space that is generated based on an augmented reality display technology.

9. The method according to claim 8, wherein the creating a virtual plane in the real-time scene image comprises:
    in response to detecting that a target plane region exists in the real-time scene image, creating the virtual plane based on the target plane region, wherein the target plane region is a plane region having a distance to the image acquisition unit within at least one of a first preset distance range or a plane region located in a central region of the real-time scene image; or
    creating the virtual plane at a particular position in the real-time scene image.

10. The method according to claim 8, wherein the displaying the virtual image of the target object in the three-dimensional space that is generated based on an augmented reality display technology comprises:
    determining a target position in the three-dimensional space; and
    displaying the virtual image corresponding to the target object at the target position in the three-dimensional space based on the augmented reality display technology.

11. The method according to claim 10, wherein the determining a target position in the three-dimensional space comprises:
    receiving an instruction of specifying a position point from the user; and
    establishing a three-dimensional anchor point in the three-dimensional space based on the position point, and identifying the three-dimensional anchor point as the target position.

12. The method according to claim 1, after generating the virtual image corresponding to the target object based on the target object image and before displaying the virtual image corresponding to the target object in the real-time scene image based on the augmented reality display technology, further comprising:

suspending the virtual image at a predetermined position in front of the image acquisition unit.

13. The method according to claim 1, further comprising:
in response to determining that at least one virtual image already exists in the real-time scene image and a distance between a position of the at least one virtual image already existing and the virtual image corresponding to the target object exceeds a second preset distance range, moving the at least one virtual image already existing into the second preset distance range of the virtual image corresponding to the target object and displaying the at least one virtual image.

14. The method according to claim 1, wherein the displaying the virtual image corresponding to the target object in the real-time scene image based on the augmented reality display technology, further comprising:
displaying a shadow of the virtual image at a particular position around the virtual image.

15. The method according to claim 1, further comprising:
dynamically displaying the virtual image corresponding to the target object in the real-time scene image based on an augmented reality display technology.

16. A system, comprising:
at least one processor; and
at least one memory comprising computer-readable instructions that upon execution by the at least one processor cause the system to perform operations comprising:
obtaining a target object image in a real-time scene image captured by an image acquisition unit in response to a first instruction from a user;
generating a virtual image corresponding to a target object based on the target object image, wherein the generating a virtual image corresponding to a target object based on the target object further comprises:
obtaining an animation material, the animation material comprising at least one of a limb-body animation material or an expression animation material, and
synthesizing the animation material with the target object image and generating the virtual image corresponding to the target object;
displaying the virtual image corresponding to the target object in the real-time scene image;
wherein the operations further comprise:
in response to determining that a plurality of virtual images already exist in the real-time scene image, performing collision detection among the plurality of virtual images; and
in response to determining that a collision occurs between any two virtual images, moving any one of the two virtual images colliding with each other.

17. The system according to claim 16, wherein the synthesizing the animation material with the target object image further comprises:
determining a plurality of connection points on the target object image, wherein the plurality of connection points indicate positions by which the animation material is connected to the target object image; and
synthesizing the animation material with the target object image based on the plurality of connection points to generate the virtual image corresponding to the target object.

18. A non-transitory computer-readable storage medium, storing computer-readable instructions that upon execution by a processor cause the processor to implement operations, the operations comprising:
obtaining a target object image in a real-time scene image captured by an image acquisition unit in response to a first instruction from a user;
generating a virtual image corresponding to a target object based on the target object image, wherein the generating a virtual image corresponding to a target object based on the target object further comprises:
obtaining an animation material, the animation material comprising at least one of a limb-body animation material or an expression animation material, and
synthesizing the animation material with the target object image and generating the virtual image corresponding to the target object;
displaying the virtual image corresponding to the target object in the real-time scene image;
wherein the operations further comprise:
in response to determining that a plurality of virtual images already exist in the real-time scene image, performing collision detection among the plurality of virtual images; and
in response to determining that a collision occurs between any two virtual images, moving any one of the two virtual images colliding with each other.

19. The non-transitory computer-readable storage medium according to claim 18, wherein the synthesizing the animation material with the target object image further comprises:
determining a plurality of connection points on the target object image, wherein the plurality of connection points indicate positions by which the animation material is connected to the target object image; and
synthesizing the animation material with the target object image based on the plurality of connection points to generate the virtual image corresponding to the target object.

* * * * *